United States Patent
Elam

(10) Patent No.: US 8,767,796 B2
(45) Date of Patent: Jul. 1, 2014

(54) METHOD AND APPARATUS FOR SPACE DIVISION MULTIPLE ACCESS RECEIVER

(75) Inventor: Carl M. Elam, Perry Hall, MD (US)

(73) Assignee: Greenwich Technologies Associates, Greewich, CT (US)

(*) Notice: Subject to any disclaimer, the term of this patent is extended or adjusted under 35 U.S.C. 154(b) by 0 days.

(21) Appl. No.: 12/391,364

(22) Filed: Feb. 24, 2009

(65) Prior Publication Data

US 2009/0323869 A1 Dec. 31, 2009

Related U.S. Application Data

(63) Continuation of application No. 11/831,604, filed on Jul. 31, 2007, now Pat. No. 7,496,129, which is a continuation of application No. 10/983,899, filed on Nov. 9, 2004, now Pat. No. 7,251,286, which is a continuation of application No. 09/697,187, filed on Oct. 27, 2000, now Pat. No. 6,823,021.

(51) Int. Cl.
*H04L 27/30* (2006.01)

(52) U.S. Cl.
USPC ........... 375/142; 375/150; 375/267; 375/343; 375/347; 455/137; 455/273; 342/368; 342/378

(58) Field of Classification Search
USPC ......... 375/260, 267, 324, 340, 343, 347, 349, 375/141, 142, 147, 150; 455/131, 132, 137, 455/193.1, 214, 227, 269, 270, 272, 273, 455/275, 303; 342/359, 361, 362, 367, 368, 342/378, 380, 382, 383, 417, 423
See application file for complete search history.

(56) References Cited

U.S. PATENT DOCUMENTS

| | | | |
|---|---|---|---|
| 3,680,100 A | 7/1972 | Woerrlein |
| 4,028,699 A | 6/1977 | Stevens |
| 4,045,796 A | 8/1977 | Kline, Jr. |
| 4,130,811 A | 12/1978 | Katz et al. |
| 4,330,876 A | 5/1982 | Johnson |

(Continued)

FOREIGN PATENT DOCUMENTS

| | | |
|---|---|---|
| EP | 0893703 A1 | 1/1999 |
| JP | 2000339929 A | 12/2000 |
| WO | 9312590 A1 | 6/1993 |
| WO | 9837654 A2 | 8/1998 |

*Primary Examiner* — Dac Ha
(74) *Attorney, Agent, or Firm* — Snyder, Clark, Lesch & Chung, LLP

(57) ABSTRACT

Methods and systems consistent with this invention receive a plurality of transmitted signals in a receiver having a plurality of receive elements, wherein each transmitted signal has a different spatial location. Such methods and systems receive the plurality of transmitted signals at the plurality of receive elements to form a plurality of receive element signals, form a combined signal derived from the plurality of receive element signals, and detect each of the plurality of transmitted signals from the combined signal by its different spatial location. To achieve this, methods and systems consistent with this invention generate a plurality of arbitrary phase modulation signals, and phase modulate each of the plurality of receive element signals with a different one of the phase modulation signals to form a plurality of phase modulated signals. Such methods and systems then combine the plurality of phase modulated signals into a combined signal, generate expected signals, and cross-correlate the combined signal with the expected signals to form correlation signals. Such methods and systems then store the correlation signals in a correlation signal memory and analyze the correlation signals to extract information from the transmitted signals.

19 Claims, 5 Drawing Sheets

(56) References Cited

U.S. PATENT DOCUMENTS

| | | | | |
|---|---|---|---|---|
| 4,458,342 | A | 7/1984 | Tournois | |
| 4,965,732 | A | 10/1990 | Roy, III et al. | |
| 5,260,968 | A | 11/1993 | Gardner et al. | |
| 5,515,378 | A | 5/1996 | Roy, III et al. | |
| 5,566,209 | A | 10/1996 | Forssén et al. | |
| 5,592,490 | A | 1/1997 | Barratt et al. | |
| 5,619,503 | A | 4/1997 | Dent | |
| 5,649,287 | A | 7/1997 | Forssén et al. | |
| 5,722,083 | A | 2/1998 | König | |
| 5,732,075 | A | 3/1998 | Tangemann et al. | |
| 5,793,789 | A | 8/1998 | Rudish et al. | |
| 5,808,580 | A | 9/1998 | Andrews, Jr. | |
| 5,886,988 | A | 3/1999 | Yun et al. | |
| 5,909,649 | A | 6/1999 | Saunders | |
| 5,930,290 | A | 7/1999 | Zhou et al. | |
| 5,940,742 | A | 8/1999 | Dent | |
| 6,023,514 | A | 2/2000 | Strandberg | |
| 6,031,485 | A | 2/2000 | Cellai et al. | |
| 6,031,865 | A | 2/2000 | Kelton et al. | |
| 6,097,714 | A | 8/2000 | Nagatani et al. | |
| 6,107,963 | A * | 8/2000 | Ohmi et al. | 342/383 |
| 6,137,433 | A | 10/2000 | Zavorotny et al. | |
| 6,163,564 | A | 12/2000 | Rudish et al. | |
| 6,163,566 | A | 12/2000 | Shiino | |
| 6,240,122 | B1 | 5/2001 | Miyashita | |
| 6,275,679 | B1 | 8/2001 | Elam et al. | |
| 6,331,837 | B1 | 12/2001 | Shattil | |
| 6,356,528 | B1 | 3/2002 | Lundby et al. | |
| 6,362,780 | B1 | 3/2002 | Butz et al. | |
| 6,392,588 | B1 | 5/2002 | Levanon | |
| 6,463,048 | B1 * | 10/2002 | Garyantes | 370/342 |
| 6,529,545 | B2 * | 3/2003 | Tiirola et al. | 375/148 |
| 6,580,701 | B1 | 6/2003 | Ylitalo et al. | |
| 6,608,588 | B2 | 8/2003 | Elam | |
| 6,643,526 | B1 | 11/2003 | Katz | |
| 6,771,698 | B1 | 8/2004 | Beck | |
| 6,801,565 | B1 * | 10/2004 | Bottomley et al. | 375/148 |
| 6,823,021 | B1 | 11/2004 | Elam | |
| 6,833,809 | B2 | 12/2004 | Elam | |
| 7,251,286 | B2 | 7/2007 | Elam | |
| 2001/0047503 | A1 | 11/2001 | Zhang | |
| 2003/0139195 | A1 | 7/2003 | Elam | |

* cited by examiner

METHOD AND APPARATUS FOR SPACE DIVISION MULTIPLE ACCESS RECEIVER

RELATED APPLICATION

This application is a continuation of U.S. Pat. No. 7,496,129 filed on Jul. 31, 2007, which is a continuation of U.S. Pat. No. 7,251,286, filed on Nov. 9, 2004, which is a continuation of U.S. Pat. No. 6,823,021, filed on Oct. 27, 2009, all of which are incorporated herein by reference.

FIELD OF THE INVENTION

The present invention relates to wireless communication networks, and more particularly to space-division multiple access (SDMA) in wireless communication networks.

BACKGROUND OF THE INVENTION

Wireless communication services are an increasingly common form of communication, and demand for wireless services continues to grow. Examples of wireless services include cellular mobile telephones, wireless Internet service, wireless local area computer networks, satellite communication networks, satellite television, and multi-user paging systems. Unfortunately, these communication systems are confined to a limited frequency spectrum either by practical considerations or, as is often the case, by government regulation. As the maximum number of users, or "capacity," of these systems is reached, user demand for more service may be met by either (1) allocating more frequency spectrum to the wireless service, or (2) using the allocated frequency spectrum more efficiently. Because the frequency spectrum is limited and cannot keep pace with user demand, there is a critical need for new technology that uses the allocated frequency spectrum more efficiently.

Wireless communication systems are generally composed of one or more base stations through which wireless users, such as mobile telephone users, gain access to a communications network, such as a telephone network. A base station serves a number of wireless users, fixed or mobile, in a local area. To increase the capacity of the systems, service providers may install more base stations, reducing the area and the number of users handled by each base station. This approach increases system capacity without allocating more spectrum frequency bands, but is quite costly because it requires significantly more hardware.

Another approach to using the frequency spectrum more efficiently is by improving "multiple access" techniques. Multiple access techniques allow multiple users to share the allocated frequency spectrum so that they do not interfere with each other. The most common multiple access schemes are Frequency-Division Multiple Access (FDMA), Time-Division Multiple Access (TDMA), Code-Division Multiple Access (CDMA), and more recently Space-Division Multiple Access (SDMA).

FDMA slices the allocated frequency band into multiple frequency channels. Each user transmits and receives signals on a different frequency channel to avoid interfering with the other users. When one user no longer requires the frequency channel assigned to it, the frequency channel is reassigned to another user.

With TDMA, users may share a common frequency channel, but each user uses the common frequency channel at a different time. In other words, each user is allocated a time slot in which the user may transmit and receive. Thus, TDMA interleaves multiple users in the available time slots.

CDMA allows multiple users to share a common frequency channel by using coded modulation schemes. CDMA assigns distinct codes to each of the multiple users. The user modulates its digital signal by a wideband coded pulse train based on its district code, and transmits the modulated coded signal. The base station detects the user's transmission by recognizing the modulated code.

In SDMA, a system may separate a desired user's signal from other signals by its direction of arrival, or spatial characteristics. This is sometimes referred to as "spatial filtering." Thus, even though two users may be transmitting on the same frequency at the same time, the base station may distinguish them because the transmitted signals from the users are arriving from different directions. It is possible to use SDMA in combination with FDMA, TDMA, or CDMA.

A conventional SDMA receiver requires an array of multiple receive elements. Further, a conventional SDMA receiver uses a bank of phase shifters that cooperates with the receive element array to form a "beam" that "looks" in a particular direction. It is generally more desirable to form multiple beams, each directed toward a different direction, i.e., toward different users. The more beams, the more simultaneous users the SDMA system may handle operating on the same frequency at the same time. The more beams, however, the more complicated the SDMA receiver. For instance, each beam may require a separate bank of phase shifters and circuits that perform signal tracking. Additionally, each beam may require a separate "signal combiner," which combines the signals received from each receive element to form a "combined signal." Further still, each combined signal may require a separate signal detector, which detects the transmitted signal from the user. This hardware complexity greatly increases the cost of an SDMA receiver.

Using well known algorithms, hardware complexity may be reduced by performing phase shifting, signal tracking, signal combining and signal detecting in signal processing software. Current signal processing techniques, however, have difficulty identifying and tracking large numbers of simultaneously transmitted signals on the same frequency, particularly in a "multipathing" environment. A multipathing environment is one where transmitted signals may reach the receiver over multiple paths. For instance, a transmitted signal may reach the receiver (1) directly, and (2) indirectly after reflecting off objects. Multipath signals may also further complicate the complexity of the conventional SDMA receiver in the same manner as described above.

Thus, there is a need to provide an improved SDMA receiver that can simultaneously receive from multiple directions and operate in a multipath environment without likewise increasing hardware or software complexity of the receiver.

SUMMARY OF THE INVENTION

The summary and the following detailed description should not restrict the scope of the claimed invention. Both provide examples and explanations to enable others to practice the invention.

Methods and systems consistent with this invention may incorporate a multi-element receive signal array that may achieve polarization independent isotropic reception, with power gain that may be greater than isotropic. Such methods and systems may receive multiple signals having the same or different carrier frequencies, distinguish the signals, and establish their directions of arrival.

Methods and systems consistent with this invention receive a plurality of transmitted signals in a receiver having a plurality of receive elements, wherein each transmitted signal has a different spatial location. Such methods and systems receive the plurality of transmitted signals in the plurality of receive elements to form a plurality of receive element signals, form a combined signal derived from the plurality of receive element signals, and detect the plurality of transmitted signals from the combined signal by its different spatial location.

To achieve this, methods and systems consistent with this invention generate a plurality of phase modulation signals that may be arbitrary or uncorrelated, and phase modulate each of the plurality of receive element signals with a different one of the phase modulation signals to form a plurality of phase modulated signals. Such methods and systems then combine the plurality of phase modulated signals into a combined signal, generate expected signals, and correlate the combined signal with the expected signals to form correlation signals. Such methods and systems then store the correlation signals in a correlation signal memory and analyze the correlation signals to extract information from the detected transmitted signals.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION OF THE INVENTION

Overview

The following description of embodiments of the present invention refers to the accompanying drawings. Where appropriate, the same reference numbers in different drawings refer to the same or similar elements.

Methods and systems consistent with this invention overcome the hardware and software complexity of the conventional SDMA receiver in a wireless system. Such methods and systems comprise a receive element array with a plurality of receive elements. Users of the wireless system transmit a plurality of signals, each signal having a different direction or spatial location relative to the receive element array. The users may be, for instance, mobile telephone users.

The receive element array receives the plurality of transmitted signals in the plurality of receive elements to form a plurality of receive element signals. Such methods and systems form a single combined signal derived from the plurality of receive element signals, and may detect each of the plurality of transmitted signals from the single combined signal based upon its different spatial location. Thus, such methods and systems do not need multiple banks of phase shifters, multiple signal combiners, or multiple signal detectors. Instead, such methods and systems may detect signals from multiple users based on their different spatial location from a single combined signal, as opposed to forming a different combined signal for each signal from each user and detecting a signal from each combined signal.

To achieve this, methods and systems consistent with this invention generate a plurality of phase modulation signals that may be arbitrary or uncorrelated phase modulation signals, and phase modulate each of the plurality of receive element signals with a different one of the phase modulation signals to form a plurality of phase modulated signals. Such methods and systems then combine the plurality of phase modulated signals into the combined signal, generate expected signals, and correlate the combined signal with the expected signals to form correlation signals. The expected signals are the combined signals expected from the directions of the users, and may be a function of the phase modulation signals and the direction of the users. Such methods and systems then store the correlation signals in a correlation signal memory and analyze the correlation signals to extract the transmitted information in the signals from the users.

Implementation Details

Figure 1:
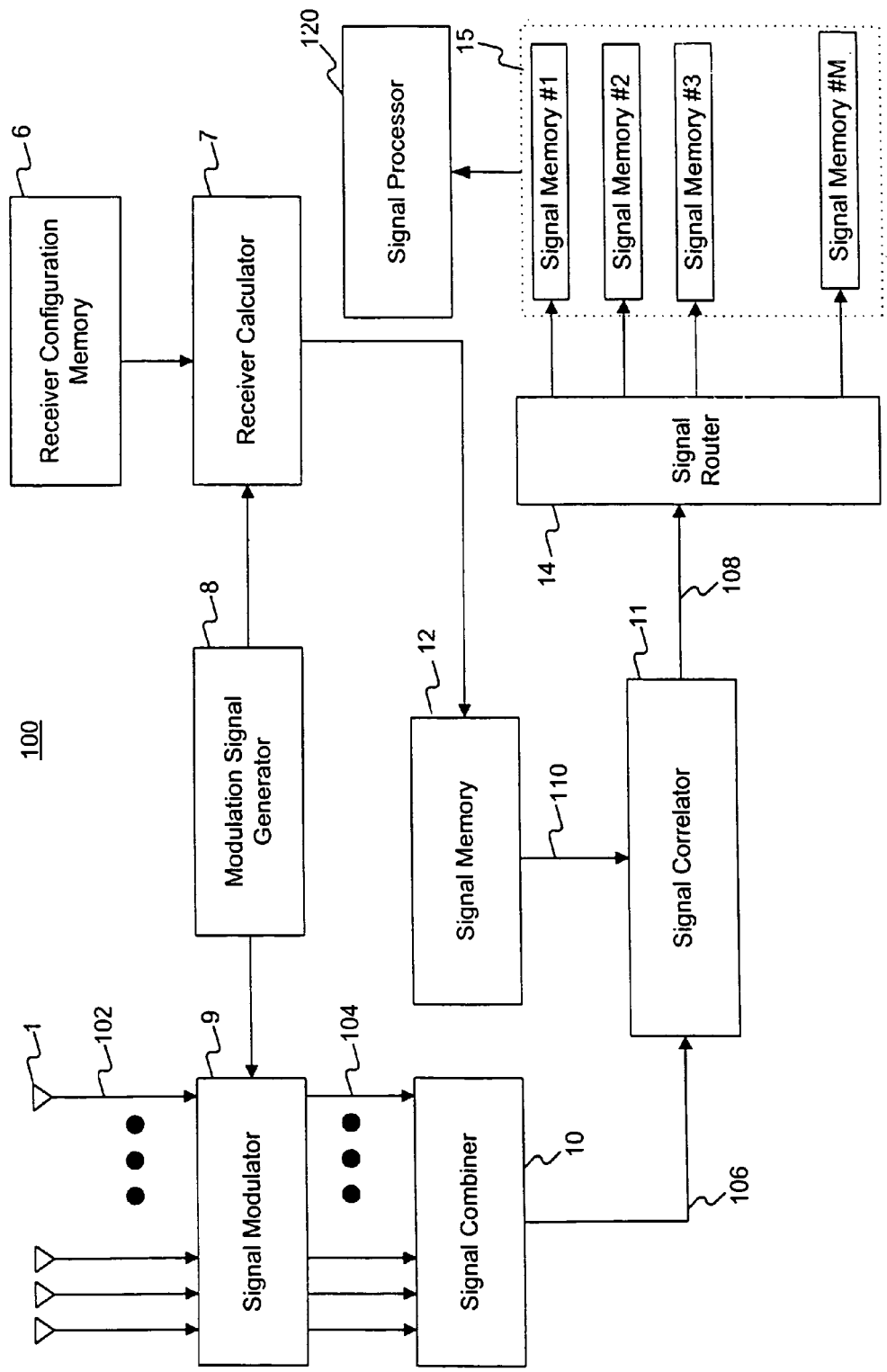
FIG. 1 is a block diagram, consistent with this invention, of a receiver.

Methods and systems consistent with this invention receive a transmitted signal in a receiver having a plurality of receive elements. FIG. 1 is a block diagram of a receiver 100 consistent with this invention. Receiver 100 comprises an array 1 having a plurality of receive elements, a modulation signal generator 8, a signal modulator 9, a signal combiner 10, a receiver configuration memory 6, a receiver calculator 7, a signal memory 12, a signal correlator 11, a signal router 14, a plurality of signal memories 15, and a signal processor 120. Receiver 100 may include other components not specifically described above such as filters, mixers, amplifiers, and power supplies. The location of these components may vary depending upon the preference of designers skilled in the art.

Figure 2:
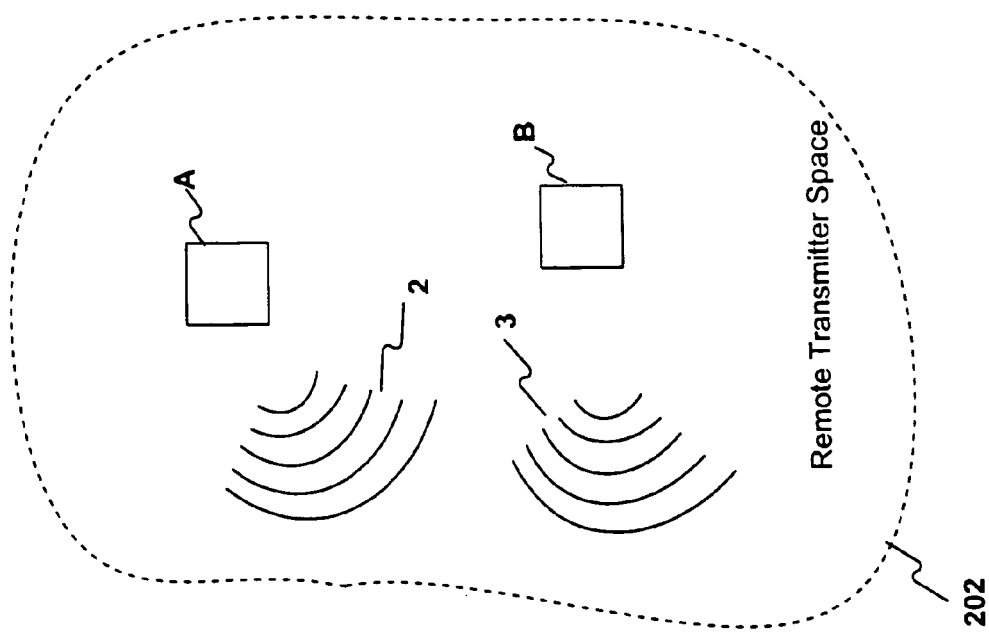
FIG. 2 is a diagram of an environment, consistent with this invention, in which the receiver of FIG. 1 may operate.
Figure 2:
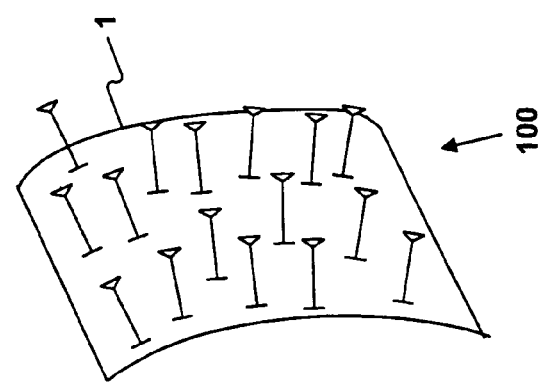

FIG. 2 is a diagram of an environment 200, consistent with this invention, in which receiver 100 may operate. In environment 200, remote transmitter A and remote transmitter B may transmit signals 2 and 3, respectively from remote transmitter space 202. Remote transmitters A and B may be mobile telephones, for example.

Transmitted signals 2 and 3 impinge on array 1, and the plurality of elements receive signals 2 and 3 to form a plurality of receive element signals. The plurality of receive element signals are conveyed (via lines 102) to a signal modulator 9, which is described in detail below.

Methods and systems consistent with this invention generate a plurality of phase modulation signals. Modulation signal generator 8 generates phase modulation signals for the receive elements of array 1. These phase modulation signals may be arbitrary or uncorrelated (correlation less than one). The uncorrelated phase modulation signals may be substantially uncorrelated or only slightly uncorrelated. For instance, the uncorrelated random phase signals may have a correlation less than 1, but greater than 0.75; less than or equal to 0.75, but greater than 0.50; less than or equal to 0.50, but greater than 0.25; less than or equal to 0.25, but greater than or equal to zero. On the other hand, some or all of these signals may be well correlated or even be identical. The phase modulation signals may be arbitrary in that they may not be correlated with, or otherwise dependent on, the geometry of the elements of array 1. The phase modulation signals may be independent of the direction of the transmitted signal.

Figure 3A:
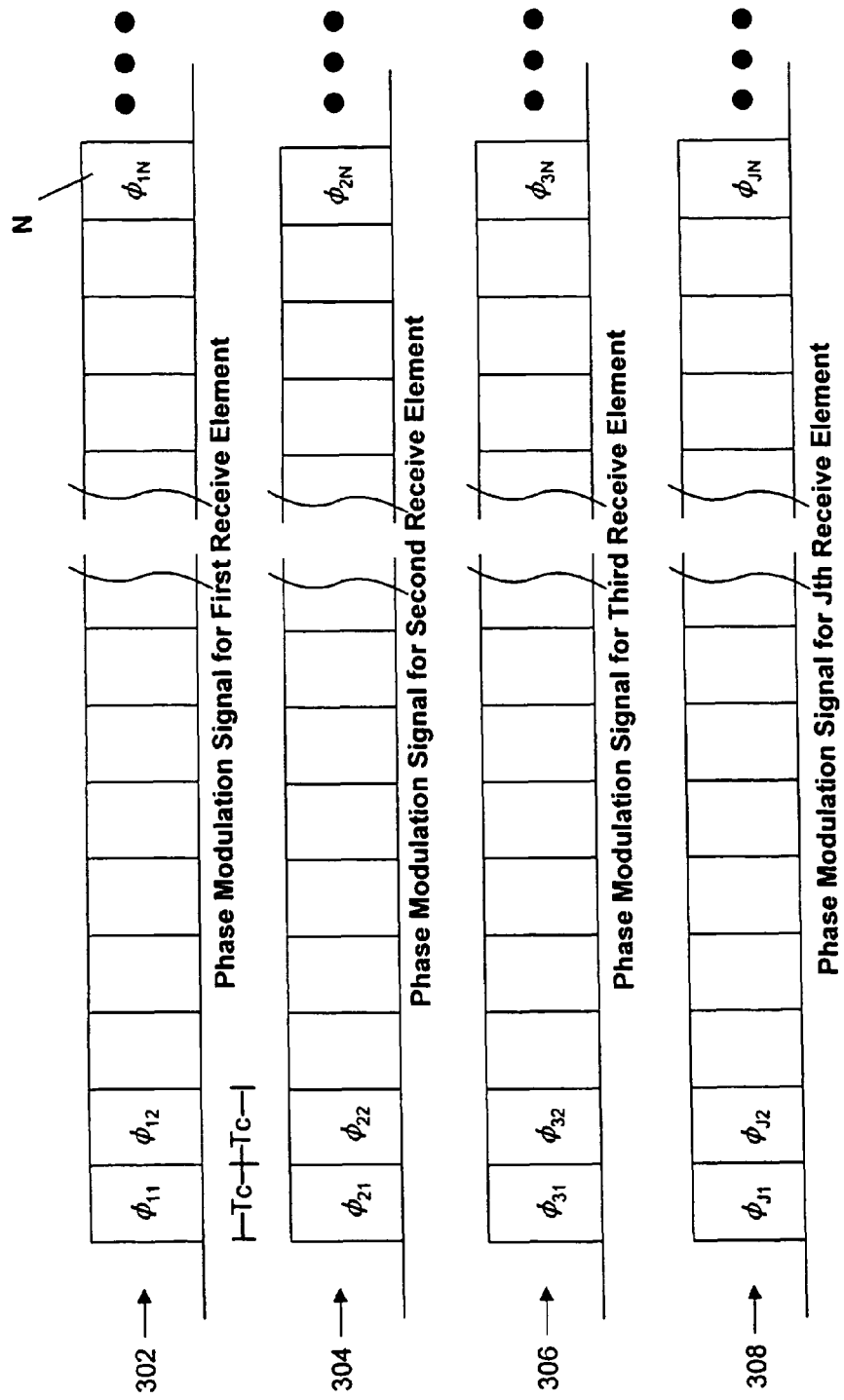
FIG. 3A is a diagram of phase modulation signals, consistent with this invention generated by a modulation signal generator as shown in FIG. 1.

FIG. 3A is a diagram of exemplary phase modulation signals for several elements of array 1. As shown in FIG. 3A, modulation signal generator 8 generates a phase $\phi_{11}$ for a duration of Tc for a first phase modulation signal 302 for a first receive element. Modulation signal generator 8 then generates a phase $\phi_{12}$ for a duration of Tc for first phase modulation signal 302. This continues, but is shown for N periods of Tc, where Tc is the period of a "chip." The allowed values of phase shift φ for each element of array 1 may be continuously variable from 0 to 2π radians or may be limited to a finite number of values, such as 0 and π radians. If a finite number of values for phase shift φ is used, each element may be assigned differing allowed values.

The same process occurs for a second phase modulation signal 304 for a second receive element. As shown in FIG. 3A, modulation signal generator 8 generates phases $\phi_{21}$ and $\phi_{22}$, and each for a duration of Tc, for the second phase modulation signal 304. This process likewise repeats for a third receive element with third phase modulation signal 306 through a Jth receive element with Jth phase modulation signal 308, where J is the total number of receive elements in array 1. The phase modulation signals are output to signal modulator 9. Modulation signal generator 8 also outputs the phase modulation signals to receiver calculator 7, which is described in detail below. Although the phases may be random, they are known to receiver 100.

Figure 3B:
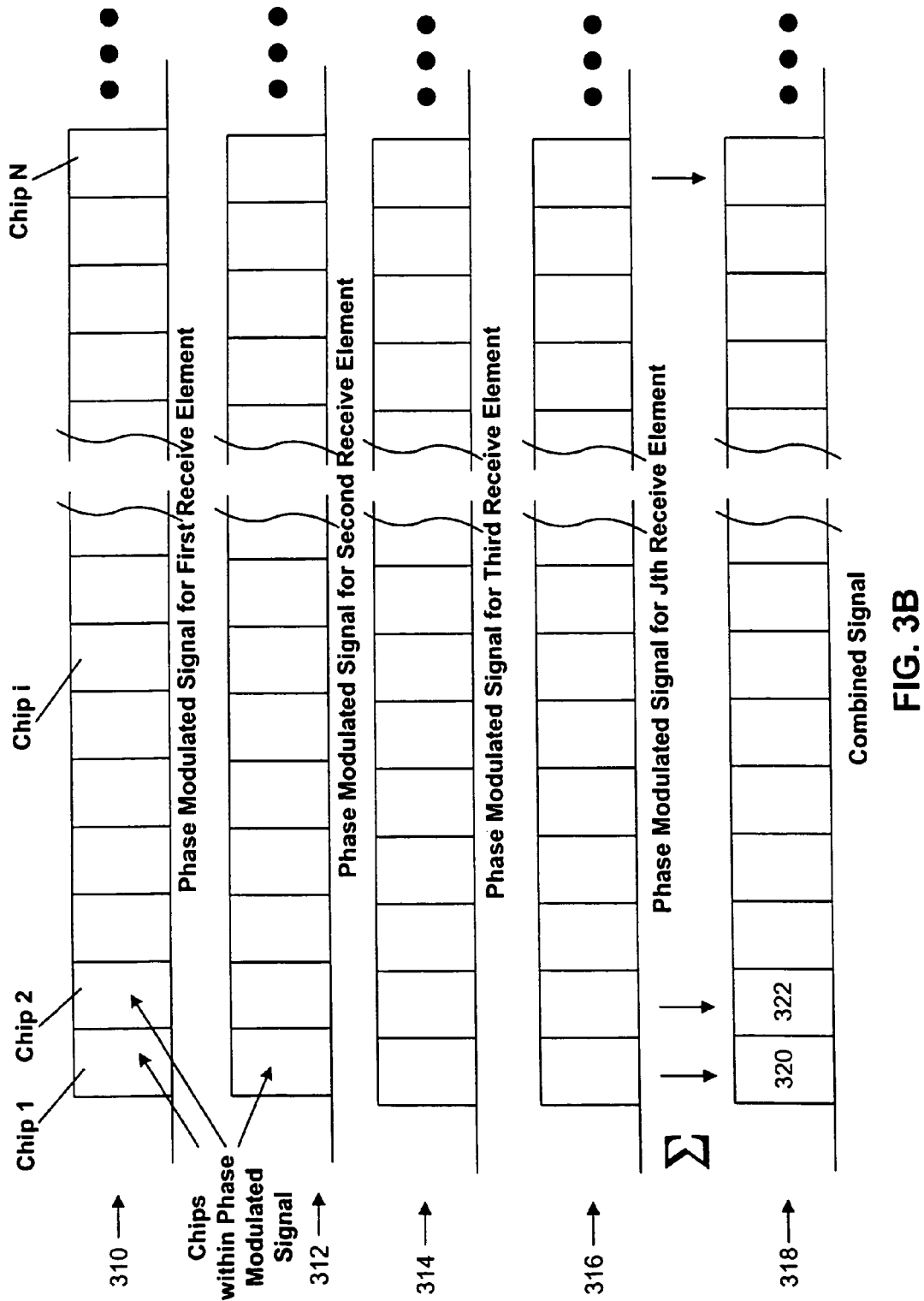
FIG. 3B is a diagram of phase modulated signals generated by a signal modulator as shown in FIG. 1, and a combined signal, all consistent with this invention.

Methods and systems consistent with this invention phase modulate each of the plurality of receive element signals with one of the phase modulation signals to form a plurality of phase modulated signals. Thus, signal modulator 9 phase modulates, or "chips," each receive element signal with one of the phase modulation signals generated by modulation signal generator 8. FIG. 3B is a diagram of phase modulated signals consistent with this invention. As shown in FIG. 3B, a first chip of first receive element phase modulated signal 310 is equal to the first receive element signal, but phase shifted by $\phi_{11}$, the first phase of phase modulation signal 302. Likewise, a second chip of phase modulated signal 310 is equal to the first receive element signal, but phase shifted by $\phi_{12}$, the second phase of phase modulation signal 302. Likewise, the second through the Jth receive element signals are phase modulated to form second 312 through Jth 316 phase modulated signals.

Phase modulated signals 310-316 output from signal modulator 9 to signal combiner 10 (via lines 104). Methods and systems consistent with this invention combine the plurality of phase modulated signals into a combined signal 318. Thus, signal combiner 10 combines the phase modulated signals into combined signal 318. In one embodiment, signal combiner 10 sums, chip by chip, the plurality of phase modulated signals to form combined signal 318. For example, all of the first chips from first phase modulated signal 310 through Jth phase modulated signal 316 are added to form a combined signal first chip 320, all of the second chips from phase modulated signal 310 through Jth phase modulated signal 316 are added to form a combined second chip 322, and so forth. Each chip of combined signal 318 may have a vector magnitude that conforms to a Rayleigh density function and may have a random phase angle. Combined signal 318 is output from signal combiner 10 to a signal correlator 11 (via line 106).

Methods and systems consistent with this invention generate an expected signal. The expected signal is the signal that the combined signal 318 is expected to be if an unmodulated carrier were transmitted from a particular direction relative to array 1. Receiver calculator 7 calculates the expected signal. For example, referring to FIG. 2, receive calculator 7 may generate an expected signal for a carrier from the direction of transmitter A. Receiver calculator 7 inputs information from modulation signal generator 8 and receiver configuration memory 6 in order to calculate the expected signal. Receiver configuration memory 6 may provide information that affects the amplitude, phase, and polarization of receive element signals and phase modulated signals before being combined in signal combiner 10. This information may include the carrier frequency of transmitted signals 2 and 3, their estimated direction, the configuration of the receive elements within array 1, and the transmission line lengths of the elements. Modulation signal generator 8 may provide information giving the relative phase of each chip within the phase modulation signals 302-308. Receiver calculator 7 calculates and outputs the expected signal to the signal memory 12 for temporary storage. The expected signal is output from the signal memory 12 and input to signal correlator 11. Because the polarization of the transmitted signal may influence the phase and magnitude of the combined signal, receiver calculator 7 may calculate the expected signal based upon an assumed polarization of the transmitted signal.

Methods and systems consistent with this invention cross-correlate combined signal 318 with the expected signal to form a correlation signal. Signal correlator 11 inputs combined signal 318 and the expected signal and correlates the two signals. In one embodiment, signal correlator 11 may cross-correlate the corresponding N consecutive chips of combined signal 318 and the expected signal. In this embodiment, the value N may be 50. Signal correlator 11 may perform a new cross-correlation between combined signal 318 and the expected signal each time N new chips (or time period N×Tc) of combined signal 318 enters correlator 11. Each time a new correlation is performed, receiver calculator 7 may update the expected signal to include the next N chips and may delete the previous chips so that the value of N may remain 50, for example. Signal correlator 11 produces an output that is a measure of the cross-correlation of combined signal 318 and the expected signal. In the example of FIG. 2, signal correlator 11 produces an output that is the correlation signal for receiver 100 "looking" in the direction of remote transmitter A provided that the expected signal being cross-correlated with combined signal 318 is that from the direction of transmitter A. The correlation signal is output to signal router 14.

Methods and systems consistent with this invention may generate a plurality of expected signals from a plurality of directions and may correlate combined signal 318 with the plurality of expected signals to form a plurality of correlation signals. For example, referring to FIG. 2, receive calculator may generate an expected signal for a carrier from the direction of transmitter A and an expected signal for a carrier of the same or different frequency from the direction of transmitter B. Thus, receiver 100 may simultaneously "look" in multiple (M) directions at one time, and receiver calculator 7 may generate M expected signals and signal correlator 11 may cross-correlate M expected signals with combined signal 318 to form M correlation signals. Each correlation signal is the detection signal for receiver 100 "looking" in that one particular direction. The M correlation signals are output to signal router 14 (via line 108).

Methods and systems consistent with this invention store the M correlation signals in correlation signal memory 15 and analyze the correlation signals. Using signal processor 120, information such as voice or other data is extracted from the correlation signals. Signal router 14 passes each of the M correlation signals to one of the several signal memory units 1 to M, respectively. Signal memory units 1 to M store successive correlation signals from an assigned direction 1 to M, respectively.

If the processing is at sufficiently high speeds, receiver 100 can simultaneously process and detect signals from many directions. Alternatively, signal memories 1 to M store correlation signals for different individual transmitters, such as transmitter A or B. This is useful if a transmitter is mobile, and thus constantly changing direction with respect to receiver 100. In this case, the direction used by receiver calculator 7 to establish the expected signal for a mobile transmitter is continuously updated to correspond to the current transmitter location.

Array 1 may not have directional characteristics, but rather it may be isotropic (omnidirectional). The arbitrary relationship of the phase modulation signals may give a combined signal block of N chips, regardless of the transmitted signal's direction of arrival, the same average energy within the receiver. Array 1 and receiver 100 also may be designed such that it is isotropic with respect to transmitted signals within a more limited transmitter space.

Figure 4:
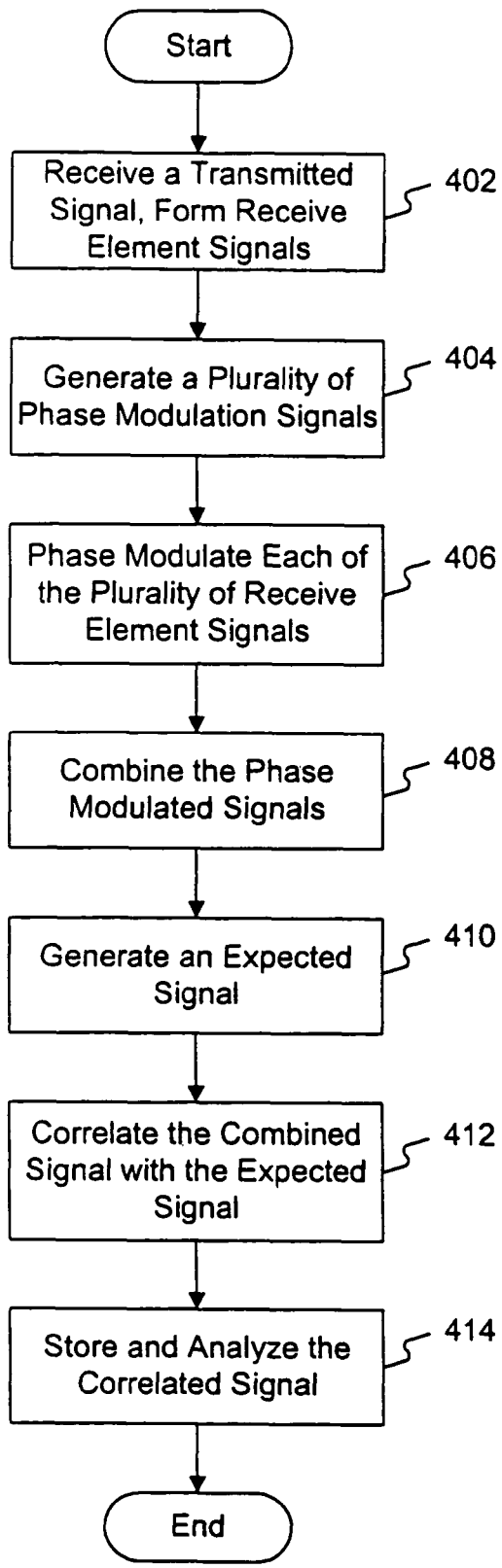
FIG. 4 is a flow chart of a process 400 for space-division multiple access receiving consistent with this invention.

FIG. 4 is a flow chart of a process 400 for space-division multiple access receiving consistent with this invention. First, methods and systems, consistent with this invention receive a transmitted signal in the plurality of receive elements to form a plurality of receive element signals (step 402). Such systems then generate a plurality of phase modulation signals (step 404) and phase modulate each of the plurality of receive element signals with a different one of the phase modulation signals to form a plurality of phase modulated signals (step 406). Such methods and systems then combine the plurality of phase modulated signals into a combined signal (step 408). Such methods and systems then generate an expected signal (step 410) and cross-correlate combined signal 318 with the expected signal to form a correlation signal (step 412). Such methods and systems then store the correlation signal in a correlation, signal memory and analyze, the correlation signal (step 414).

Expected Signal Polarization

The polarization of the transmitted signal, in general, may affect the expected signal. If the polarization of the transmitted signal is known in advance, then receiver calculator 7 may use this value in calculating the expected signal. If the value of the polarization is not known in advance, receiver calculator 7 has several options. One option is to assume a value for the polarization and calculate the expected signal based upon this assumed value. In this option, the component of the polarization of the transmitted signal that coincides with the assumed polarization is detected.

Another option is for receiver calculator 7 to calculate two expected signals. The first expected signal is calculated based upon an assumed polarization as before, and the second expected signal is calculated based upon a polarization normal (orthogonal) to the first polarization. The transmitted signal is detected by separately correlating the combined signal with the first and second expected signals, forming two correlation signals. These two correlation signals may be processed individually or may be combined by signal processor 120 in order to extract the information from the transmitted signal.

Yet another option is to calculate two expected signals as before, the first expected signal based upon an assumed polarization and the second expected signal based upon a normal (orthogonal) polarization. In this option, the two expected signals are summed or otherwise combined to form a third expected signal. The transmitted signal is detected by correlating the combined signal with the third expected signal. Regardless of the polarization of the transmitted signal, in this option there is good correlation with the third expected signal.

These techniques, along with others, devised by those skilled in the art may be used to detect and extract information from transmitted signals with any type of polarization characteristics, such as linear, circular, or elliptical.

Processing Gain

Methods and systems consistent with this invention may generate a plurality of phase modulation signals, wherein the phase modulation signals have a chipping rate and the chipping rate exceeds a modulation rate of the transmitted signal. In one embodiment, signal modulator 9 may chip the received element signals continuously at a rate that is at least one-hundred times the period of the highest modulation frequency of the transmitted signal. This chipping rate may allow signal correlator 11, which in one embodiment processes a block of fifty chips at one time, to contain no more than one half-cycle or one half-wave of the modulation signal impressed upon any carrier, thus meeting the minimum Nyquist sampling rate. Thus, in one embodiment, the correlation length of fifty chips at a chipping rate of at least one-hundred times the highest modulation rate corresponds to the maximum Nyquist sampling interval. This may permit complete recovery of the modulation information from any carrier. Values of N other than 50 are possible, and satisfying the minimum Nyquist rate may result in different chipping rates.

The amplitude and phase of each chip within combined signal 318 (FIG. 3B) on line 106 (FIG. 1) may depend upon the angle of arrival of a transmitted signal at the receive elements of array 1. Receiver calculator 7, in order to differentiate between signals arriving from different directions, anticipates and calculates for each direction the expected chip amplitude and phase patterns that may be present within combined signal 318. For each direction, signal correlator 11 cross-correlates the expected chip patterns i.e., the expected signal, with combined signal 318. In signal memory 12, there are K expected chip patterns from K different directions. In one embodiment, K is equal to M, as discussed above.

Signal correlator 11 may have a processing gain of $\sqrt{N}$, where N is the number of chips, within the combined signal 318, processed together at the same time. The N chips form a block of duration T. The cross-correlation described is between combined signal 318 and the plurality of K expected signals.

In one embodiment, the value for processing gain is established as follows. A combined signal block containing N chips (spanning the time interval from a start time t1 of first chip to an end time t1+T of the Nth chip) has a correlation energy expression of $$R_{ER}(K,\theta) = \int_{t1}^{t1+T} \{\vec{v}_{EK}(t)\} \cdot \{\vec{v}_R(t) e^{+j\theta}\} dt,$$

where $\vec{v}_R(t)$ is combined signal 318 comprising N chips and $\vec{v}_{ER}(t)$ is the corresponding Kth expected signal also comprising N chips. Each clip of $\vec{v}_R(t)$ and $\vec{v}_{EK}(t)$ has a square value of $\alpha_R^2$ and $\alpha_{EK}^2$ respectively and a root-mean-square (ms) value of $\alpha_R$ and $\alpha_{EK}$ respectively. They may be substantially random vectors that conform to Rayleigh density functions with random phase and expected magnitude values of $$\frac{\sqrt{\pi}}{2}\alpha_R \text{ and } \frac{\sqrt{\pi}}{2}\alpha_{EK}$$

respectively. These substantially random vectors may each be composed of the sum of random phase chips within the phase modulated signals input to signal combiner 10. The phase shift term $e^{+j\theta}$ may be applied equally to all chips of a combined signal block where the parameter $\theta$ may be chosen to maximize the correlation output for each processed combined signal block. In wireless systems where the transmitted signal is phase modulated, as with QPSK, the parameter $\theta$ is part of the correlation signal and may be used to derive the carrier phase information. In systems where the transmitted signal is amplitude modulated, the magnitude of the cross-correlation is part of the correlation signal and may be used to derive the carrier amplitude information.

The magnitude of the correlation energy of N chips that are well correlated is $$N\alpha_R \alpha_{EK}\left(\frac{T}{N}\right),$$

where T is the combined signal block duration and where $$\left(\frac{T}{N}\right)$$

is the time interval of a single chip, or Tc.

If, on the other hand, the combined signal block of chips is random with respect to the corresponding expected signal block of chips, i.e., they are not correlated, the magnitude of the correlation energy of the N chips is $$\sqrt{N\alpha_R}\, \alpha_{EK}\left(\frac{T}{N}\right).$$

In this case, the N combined signal vectors (chips) have random phases with respect to the corresponding N expected signal vectors (chips). The sum of N random vectors (with r.m.s. value of $\alpha_R$) is two-dimensional Gaussian (with r.m.s. value of $\sqrt{N\alpha_R}$). This two-dimensional Gaussian density function may also be described as a Rayleigh density function.

The value for processing gain is found by forming the ratio of the correlator output for a well correlated signal $$\sqrt{N\alpha_R}\, \alpha_{EK}\left(\frac{T}{N}\right)$$

and an uncorrelated signal $$\sqrt{N\alpha_R}\, \alpha_{EK}\left(\frac{T}{N}\right).$$

One skilled in the art appreciates that numerous variations to this system exist. For example, methods and systems consistent with this invention also may function with acoustic signals, not only electromagnetic signals. For instance, the transmitted signals may be acoustic signals conveyed through water, and the receive element signals, the combined signal, and the expected signals may all represent acoustic signals in a receiver and processor. Such a system may provide for an undersea data link or any type of sonic signal detection. In such a system, the receive elements of array 1 are acoustic sensors.

Also, it is generally easier for signal processors to generate pseudo-random numbers rather than purely random numbers, and thus the term "random" includes "pseudo-random." Therefore, modulation signal generator 8 may generate pseudo-random phase modulation signals and signal modulator 9 may generate pseudo-random phase modulated signals. This applies for phase modulation signals $\phi$ that are either continuously variable or limited to a finite number of values.

Further, the technique used for comparing the combined signal with the expected signals, herein described as correlation, may draw upon any suitable signal comparison techniques well known in signal processing for recovering the magnitude and phase information from the transmitted signal.

Further still, array 1 may take on many different shapes. For example, array 1 may be flat, spherical, or cylindrical. It may also conform to a surface, such as the outside of an airplane or an automobile.

Lastly, all or some of the functions performed by signal modulator 9, signal combiner 10, modulation signal generator 8, signal memory 12, signal correlator 11, signal router 14, receiver calculator 7, receiver configuration memory 6, and signal processor 120 may be implemented in software, not necessarily hardware.

Although methods and systems consistent with the present invention have been described with reference to an embodiment thereof, those skilled in the art know various changes in form and detail that may be made without departing from the spirit and scope of the present invention as defined in the appended claims and their full scope of equivalents.

The invention claimed is:

1. A method comprising:
   receiving a plurality of electromagnetic radiation signals at an array;
   generating a plurality of random modulation signals;
   modulating each of the plurality of received signals with a respective one of the random modulation signals to form a plurality of modulated signals;
   summing the plurality of modulated signals into a combined signal; and
   correlating the combined signal with an expected signal to form a correlation signal.

2. The method of claim 1, further comprising generating the expected signal.

3. The method of claim 2, wherein receiving the plurality of electromagnetic radiation signals includes receiving the plurality of electromagnetic signals over a period of time, the method further comprising:
   generating successive pluralities of random modulation signals; and
   modulating the plurality of received signals with the successive pluralities of random modulation signals to form successive pluralities of modulated signals corresponding to the period of time.

4. The method of claim 3, wherein summing the plurality of modulated signals includes combining the successive pluralities of modulated signals to form a sequence of combined signals corresponding to the period of time.

5. The method of claim 4, wherein each of the successive pluralities of random modulation signals is uncorrelated.

6. The method of claim 5, wherein correlating includes correlating the sequence of combined signals with the expected signal to form a correlation signal.

7. The method of claim 3, wherein generating an expected signal comprises generating the expected signal as a function of the successive pluralities of random modulation signals.

8. The method of claim 1, wherein the array includes a plurality of elements and each element receives one of the plurality of electromagnetic radiation signals.

9. A method comprising:
receiving a plurality of electromagnetic radiation signals at an array;
generating a plurality of modulation signals, the plurality of modulation signals being uncorrelated;
modulating each of the plurality of received signals with a respective one of the plurality of modulation signals to form a plurality of modulated signals;
summing the plurality of modulated signals into a combined signal; and
correlating the combined signal with an expected signal to form a correlation signal.

10. The method of claim 9, wherein receiving the plurality f electromagnetic signals includes:
receiving the plurality of electromagnetic radiation signals over a period of time, generating successive pluralities of modulation signals, each of the plurality of modulation signals being uncorrelated; and
modulating the plurality of received signals with the successive pluralities of modulation signals to form successive pluralities of modulated signals corresponding to the period of time.

11. The method of claim 10, further comprising generating an expected signal.

12. The method of claim 11, wherein summing the plurality of modulated signals into a combined signal includes combining the successive pluralities of modulated signals to form a sequence of combined signals corresponding to the period of time.

13. The method of claim 12, wherein the successive pluralities of modulation signals include successive pluralities of random modulation signals.

14. The method of claim 13, wherein generating an expected signal comprises generating the expected signal as a function of the successive pluralities of modulation signals.

15. The method of claim 14, wherein correlating the combined signal with the expected signal includes correlating the sequence of combined signals with the expected signal.

16. An apparatus comprising:
an array to receive a plurality of electromagnetic radiation signals;
a modulator to modulate each of the plurality of received signals with a respective one of a plurality of random modulation signals to form a plurality of modulated signals; and
a signal combiner to combine the plurality of modulated signals into a combined signal,
wherein the array is configured to receive the plurality of electromagnetic signals over a period of time, wherein the modulator is configured to modulate the plurality of received signals with successive pluralities of random modulation signals to form successive pluralities of modulated signals corresponding to the period of time.

17. The apparatus of claim 16, wherein the signal combiner is configured to combine the pluralities of modulated signals to form a sequence of combined signals corresponding to the period of time.

18. The apparatus of claim 17, wherein each of the successive pluralities of random modulation signals are uncorrelated.

19. The apparatus of claim 17, further comprising a correlator to correlate the sequence of combined signals with an expected signal to form a correlation signal.

* * * * *